US00RE44607E

(19) United States
(12) Reissued Patent
Schloemer

(10) Patent Number: US RE44,607 E
(45) **Date of Reissued Patent: *Nov. 19, 2013**

(54) WIRELESS MESH ROUTING METHOD

(75) Inventor: Jerry R. Schloemer, Round Lake, IL (US)

(73) Assignee: JSDQ Mesh Technologies, LLC, Round Lake Beach, IL (US)

( * ) Notice: This patent is subject to a terminal disclaimer.

(21) Appl. No.: 13/593,059

(22) Filed: Aug. 23, 2012

Related U.S. Patent Documents

Reissue of:
(64) Patent No.: 6,459,899
Issued: Oct. 1, 2002
Appl. No.: 09/383,227
Filed: Aug. 26, 1999

U.S. Applications:
(63) Continuation of application No. 12/804,274, filed on Jul. 16, 2010, now Pat. No. Re. 43,675, which is a continuation of application No. 11/982,295, filed on Oct. 31, 2007, now Pat. No. Re. 41,781, which is a continuation of application No. 11/410,337, filed on Apr. 24, 2006, now Pat. No. Re. 40,258, which is a continuation of application No. 10/833,279, filed on Apr. 27, 2004, now Pat. No. Re. 40,117.

(60) Provisional application No. 60/100,074, filed on Sep. 14, 1998.

(51) Int. Cl.
*H04W 40/00* (2009.01)

(52) U.S. Cl.
USPC ..... 455/445; 455/11.1; 455/62

(58) Field of Classification Search
USPC ..... 455/62, 63.4, 11.1, 436, 445, 450, 455/432.3, 552.1, 562.1, 561, 513, 13.1, 455/525, 435.2, 560; 370/334, 315, 216, 370/238, 351
See application file for complete search history.

(56) References Cited

U.S. PATENT DOCUMENTS

| | | | |
|---|---|---|---|
| 4,125,808 | A | 11/1978 | Graham |
| 4,284,848 | A | 8/1981 | Frost |
| 4,475,010 | A | 10/1984 | Huensch et al. |
| 4,534,024 | A | 8/1985 | Maxemchuk et al. |
| 4,794,649 | A | 12/1988 | Fujiwara |
| 4,860,119 | A | 8/1989 | Maniwa et al. |

(Continued)

OTHER PUBLICATIONS

Ramanathan, S., et al, "A Survey of Routing Techniques for Mobile Communications Networks," Mobile Networks and Applications, vol. 1, 1996, pp. 89-104.

(Continued)

*Primary Examiner* — Jean Gelin
(74) *Attorney, Agent, or Firm* — David M. Quinlan, P.C.

(57) ABSTRACT

A routing system of call connection and call routing for radio telephone communications system including cellular radio systems wherein the mobiles transmit on channels in a first band, and the bases transmit on channels in a second band. The routes are selectable from more than one possible route to a desired destination using routing tables to permit different destinations for different calls selectively based on telephone number indications. The system includes multiple blind nodes that do not support direct base to mobile communication. The blind nodes transmitting in the band used for transmission by the mobiles, and nodes receive in the band used for receiving by the mobiles such that the system performs in a limited number of bands of frequencies.

64 Claims, 6 Drawing Sheets

(56) References Cited

U.S. PATENT DOCUMENTS

| | | | | |
|---|---|---|---|---|
| 4,937,822 | A | | 6/1990 | Weddle et al. |
| 4,965,850 | A | | 10/1990 | Schloemer |
| 4,989,230 | A | | 1/1991 | Gillig et al. |
| 5,101,451 | A | | 3/1992 | Ash et al. |
| 5,115,430 | A | | 5/1992 | Hahne et al. |
| 5,127,042 | A | * | 6/1992 | Gillig et al. ..... 455/11.1 |
| 5,152,002 | A | | 9/1992 | Leslie et al. |
| 5,323,384 | A | | 6/1994 | Norwood et al. |
| 5,408,679 | A | | 4/1995 | Masuda |
| 5,412,654 | A | | 5/1995 | Perkins |
| 5,425,085 | A | | 6/1995 | Weinberger et al. |
| 5,428,636 | A | | 6/1995 | Meier |
| 5,430,729 | A | | 7/1995 | Rahnema |
| 5,440,623 | A | | 8/1995 | Moore et al. |
| 5,455,569 | A | | 10/1995 | Sherman et al. |
| 5,483,668 | A | | 1/1996 | Malkamaki et al. |
| 5,504,746 | A | | 4/1996 | Meier |
| 5,526,414 | A | | 6/1996 | Bedard et al. |
| 5,570,084 | A | | 10/1996 | Ritter et al. |
| 5,588,048 | A | | 12/1996 | Neville |
| 5,590,188 | A | | 12/1996 | Crockett |
| 5,590,395 | A | | 12/1996 | Diekelman |
| 5,610,821 | A | | 3/1997 | Gazis et al. |
| 5,633,922 | A | | 5/1997 | August et al. |
| 5,659,544 | A | | 8/1997 | La Porta et al. |
| 5,737,403 | A | | 4/1998 | Zave |
| 5,748,619 | A | | 5/1998 | Meier |
| 5,754,630 | A | | 5/1998 | Srinivasan |
| 5,757,783 | A | | 5/1998 | Eng et al. |
| 5,764,741 | A | | 6/1998 | Barak |
| 5,787,148 | A | | 7/1998 | August |
| 5,790,938 | A | | 8/1998 | Talarmo |
| 5,793,842 | A | | 8/1998 | Schloemer et al. |
| 5,850,605 | A | | 12/1998 | Souissi et al. |
| 5,860,058 | A | | 1/1999 | Daniel et al. |
| 5,890,054 | A | | 3/1999 | Logsdon et al. |
| 5,890,067 | A | | 3/1999 | Chang et al. |
| 5,907,540 | A | | 5/1999 | Hayashi |
| 6,023,623 | A | | 2/2000 | Benkner et al. |
| 6,052,557 | A | | 4/2000 | Kinnunen et al. |
| 6,055,411 | A | | 4/2000 | Ishida et al. |
| 6,055,429 | A | | 4/2000 | Lynch |
| 6,246,380 | B1 | | 6/2001 | Chow |
| 6,363,062 | B1 | | 3/2002 | Aaronson et al. |
| 6,459,899 | B1 | | 10/2002 | Schloemer |
| 6,480,719 | B1 | | 11/2002 | Schloemer |
| 6,704,301 | B2 | | 3/2004 | Chari et al. |
| 6,873,848 | B2 | | 3/2005 | Schloemer |
| 6,965,575 | B2 | | 11/2005 | Srikrishna et al. |
| 7,058,021 | B2 | | 6/2006 | Srikrishna et al. |
| 7,286,828 | B2 | | 10/2007 | Schloemer |
| RE40,117 | E | | 2/2008 | Schloemer |
| RE40,258 | E | | 4/2008 | Schloemer |
| RE41,781 | E | | 9/2010 | Schloemer |
| 7,916,648 | B2 | | 3/2011 | Schloemer |
| RE43,675 | E | | 9/2012 | Schloemer |
| 2012/0202506 | A1 | | 8/2012 | Schloemer |

OTHER PUBLICATIONS

Drucker, Elliott H., "The Advantages of Broadband LPAs" Cellular Business (Nov. 1994), pp. 46-52.

Arunkumar, S., and Panwar R.S., "Efficient Broadcast Using Selective Flooding," Dept. of Computer Sciece and Engineering, Indian Institute of Technology, Bombay, IEEE INFOCOM '92 (Jun. (?) 1992), pp. 2060-2066.

Cox, Donald C., "Wireless Network Access for Personal Communications," IEEE Communications Magazine (Dec. 1992), pp. 96-115.

Perkins et al., "Highly Dynamic Destination-Sequenced Distance-Vector Routing (DSDV) for Mobile Computers," Proceedings of the ACM SIGCOMM '94 Conf. on Communications, Protocols and Applications, London, UK (Aug. 31-Sep. 2, 1994).

Sasieni et al., "Operations Research," John Wiley & Sons (1959), pp. 270-279.

Civil Docket, *JSDQ Mesh Technologies LLC* v. *Belair Networks Inc. et al.,* Case No. 1:12-cv-00847 (D. Del.), Mar. 18, 2013.

Complaint for Patent Infringement, *JSDQ Mesh Technologies LLC* v. *Belair Networks Inc. et al.,* Case No. 1:12-cv-00847 (D. Del.), Jul. 5, 2012.

Defendants' Answer and Affirmative Defenses, *JSDQ Mesh Technologies LLC* v. *Belair Networks Inc. et al.,* Case No. 1:12-cv-00847 (D. Del,), Oct. 12, 2012.

Civil Docket, *JSDQ Mesh Technologies LLC* v. *Tropos Networks Inc. et al.,* Case No. 1:12-cv-01220 (D. Del.), Mar. 18, 2013.

Complaint for Patent Infringement, *JSDQ Mesh Technologies LLC* v. *Tropos Networks Inc. et al.,* Case No. 1:12-cv-01220 (D. Del,), Sep. 28, 2012.

Answer, Affirmative Defenses, and Counterclaims to Complaint for Patent Infringement, *JSDQ Mesh Technologies LLC* v. *Tropos Networks Inc. et al.,* Case No. 1:12-cv-01220 (D. Del.

Plaintiff's Response to Defendants' Counterclaims, *JSDQ Mesh Technologies LLC* v. *Tropos Networks Inc. et al.,* Case No. 1:12-cv-01220 (D. Del.), Jan. 9, 2013.

Answer, Affirmative Defenses, and Amended Counterclaims to Complaint, *JSDQ Mesh Technologies LLC* v. *Tropos Networks Inc. et al.,* Case No. 1:12-cv-01220, Jan. 28, 2013.

Plaintiff's Response to Defendants' Amended Counterclaims, *JSDQ Mesh Technologies LLC* v. *Tropos Networks Inc. et al.,* Case No. 1:12-cv-01220 (D. Del.), Feb. 7, 2013.

Civil Docket, *JSDQ Mesh Technologies LLC* v. *Mesh Dynamics Inc.,* Case No. 1:13-cv-00154 (D. Del.), Mar. 18, 2013.

Complaint for Patent Infringement, *JSDQ Mesh Technologies LLC* v. *Mesh Dynamics Inc.,* Case No. 1:13-cv-00154 (D. Del.) Jan. 29, 2013.

Civil Docket, *JSDQ Mesh Technologies LLC* v. *Ruckus Wireless Inc.,* Case No. 1:13-cv-00309 (D. Del.), Mar. 18, 2013.

Defendant's First Amended Answer with Affirmative Defenses and Counter-claims, *JSDQ Mesh Technologies LLC* v. *Mesh Dynamics Inc.*, Case No. 1:13-cv-00154 (D. Del.), Jun. 13, 2013.

* cited by examiner

Libertyville Site 1188

Lincolnshire Site 1133

The "E" stands for a land phone exchange of which three are shown: Northbrook, Waukegan, and Round Lake A user located in Deerfield desires to phone Round Lake Only some of the cell sites are shown

WIRELESS MESH ROUTING METHOD

Matter enclosed in heavy brackets [ ] appears in the original patent but forms no part of this reissue specification; matter printed in italics indicates the additions made by reissue.

*CROSS-REFERENCE TO RELATED APPLICATIONS*

*This is a continuation of application Ser. No. 12/804,274, filed Jul. 16, 2010, which was a continuation of application Ser. No. 11/982,295, filed Oct. 31, 2007, now U.S. Pat. No. Re. 41,781 which was a continuation of application Ser. No. 11/410,337, filed Apr. 24, 2006, now U.S. Pat. No. Re. 40,258, which was a continuation of application Ser. No. 10/833,279, filed Apr. 27, 2004, now U.S. Pat. No. Re. 40,117, for reissue of U.S. Pat. No. 6,459,899, issued Oct. 1, 2002, on application Ser. No. 09/383,227, filed Aug. 26, 1999, which claims benefit of provisional application no. 60/100,074, filed Sep. 14, 1998.*

The present application claims the priority date of U.S. Provisional Patent Application Serial No. 60/100074 filed on Sep. 14, 1998 in the name of Jerry R. Schloemer.

BACKGROUND OF THE INVENTION

This application discloses improvements to U.S. Pat. No. 5,793,842 issued to Jerry R. Schloemer and Leo J. Aubel. U.S. Pat. No. 5,793,842 is incorporated herein by specific reference thereto. While the entire patent '842 is incorporated herein by reference, FIGS. 1-11 and the associated description are particularly pertinent to this invention. In U.S. Pat. No. 5,793,842 a method of connecting a call to a desired one of several drops (destinations) was disclosed. An originating mobile unit contacts an originating base site to set up a call. The originating base site then routes the call towards the desired destination. Included in this patent were the steps of combining route segments (links) between nodes (base sites) to make a longer route that would connect an initializing base thru one or more nodes to a desired drop or exchange dependent upon the final call destination. Then, when a call is originated, the routing tables present in the nodes would route the call to the desired destination thru one or more nodes. Signal to interference tests were used to assign interference free channels in both the mobile to base and base to base communications. Because the routing literature, refers to nodes, and the cellular radio literature refers to base sites, and the functionality of the two technologies is combined, the terms "base" and "node" will be used to refer to the same functional piece of equipment.

SUMMARY OF THE INVENTION

The invention herein describes a system and method of wireless call routing between various cell sites such that the optimum route back to one of several exchanges is chosen. Novel systems and methods of node design, antennae selection, and switching to selected drops are described.

The foregoing features and advantages of the present invention will be apparent from the following more particular description of the invention. The accompanying drawings, listed herein below, are useful in explaining the invention.

DESCRIPTION OF THE INVENTION

Figure 6:
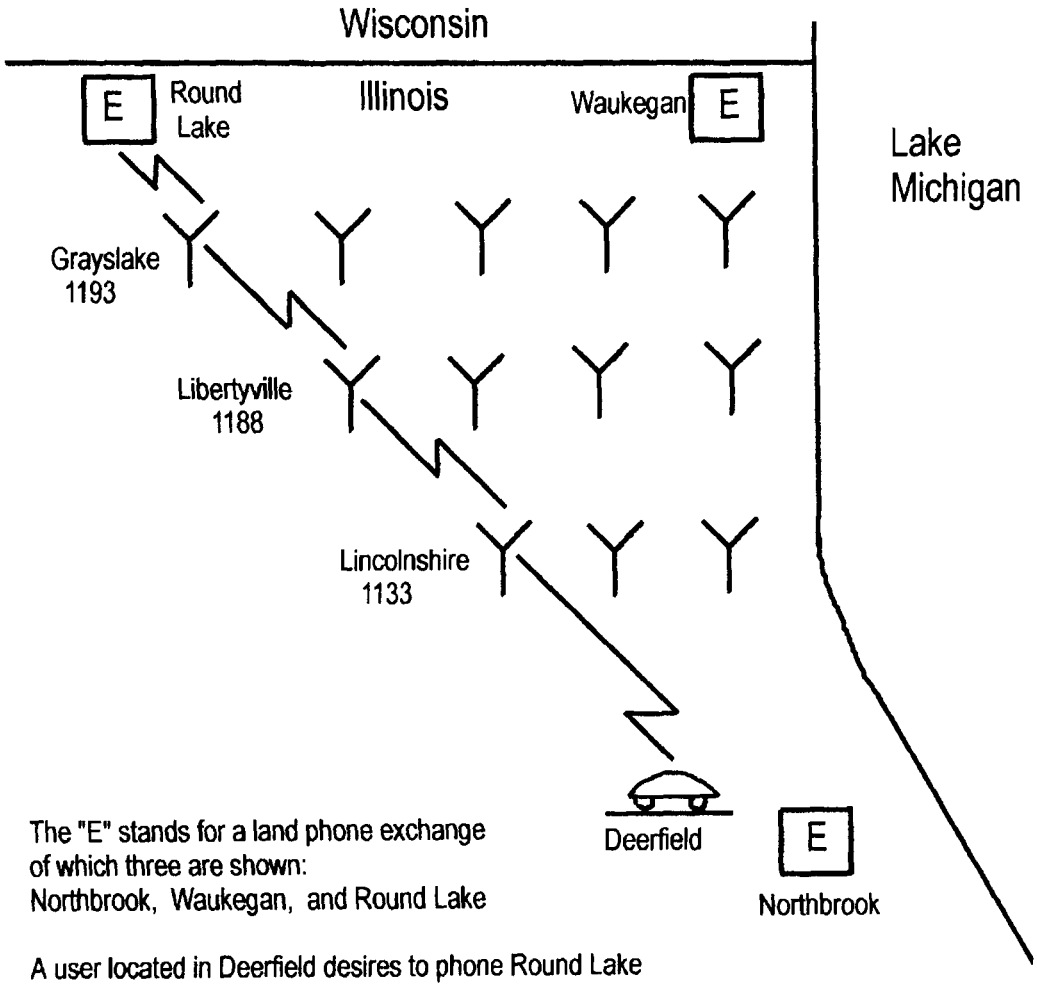
FIG. 6 Shows the geographical area and system in an overview concept.

In a large metropolitan area such as the Chicago, Ill. area, the inventive features described herein below can be combined in a single system to enhance the total system operation. For example, if a non resident long distance carrier owned the radio cellular system described, the combinations might be beneficial. In those few sites that are located near the long distance carrier's long distance switch, the base sites would be equipped with the relay closures as described below to minimize the number of calls that were routed thru the local telephone company. In sites located in the close in towns where considerable traffic was anticipated, the radio routing features as described in U.S. Pat. No. 5,793842 would be utilized in conjunction with the method of utilizing and assigning directional antennas to improve spectrum efficiency. In sites located in the far towns were radio congestion is not a problem, spectrum could be allocated to the routing function, and blind nodes would be utilized. An example of a user located in Deerfield, Ill. trying to contact a land line user located near Round Lake, Ill. is shown in FIG. 6. Only some of the cell sites are shown in the FIG. 6.

In land line telephony the present trend is to replace conventional relay closures and dedicated lines by packets of data that are routed along common lines. In the application of the invention described herein below, the inventive concepts can be utilized to support packet data.

Figure 1:
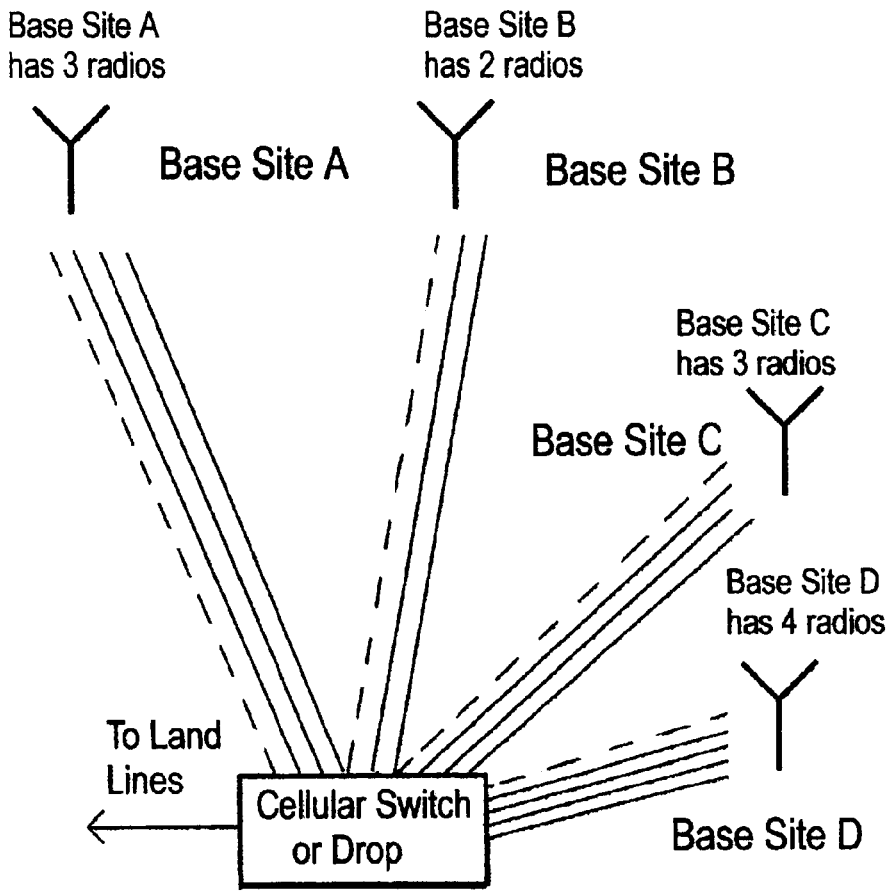
Prior Art Figure 1
FIG. 1 shows the current technology where the base sites are connected to a common central switch. Although land lines are typically used, in some systems radio links are used.

Refer to FIG. 1 which shows the prior art or current technology. In this prior art each radio is a duplex pair with a transmitter and receiver. Each radio has a circuit back to the cellular switch (or drop). The dotted lines show the control channels. In many installations of the cellular and routing system described herein, wire lines are already present that wire (connect) the base sites to various exchanges and various drops. Because of the limited radio spectrum available, it is desirable to use wire lines whenever they go to the proper destination, as the radio spectrum is too valuable to waste.

Figure 2:
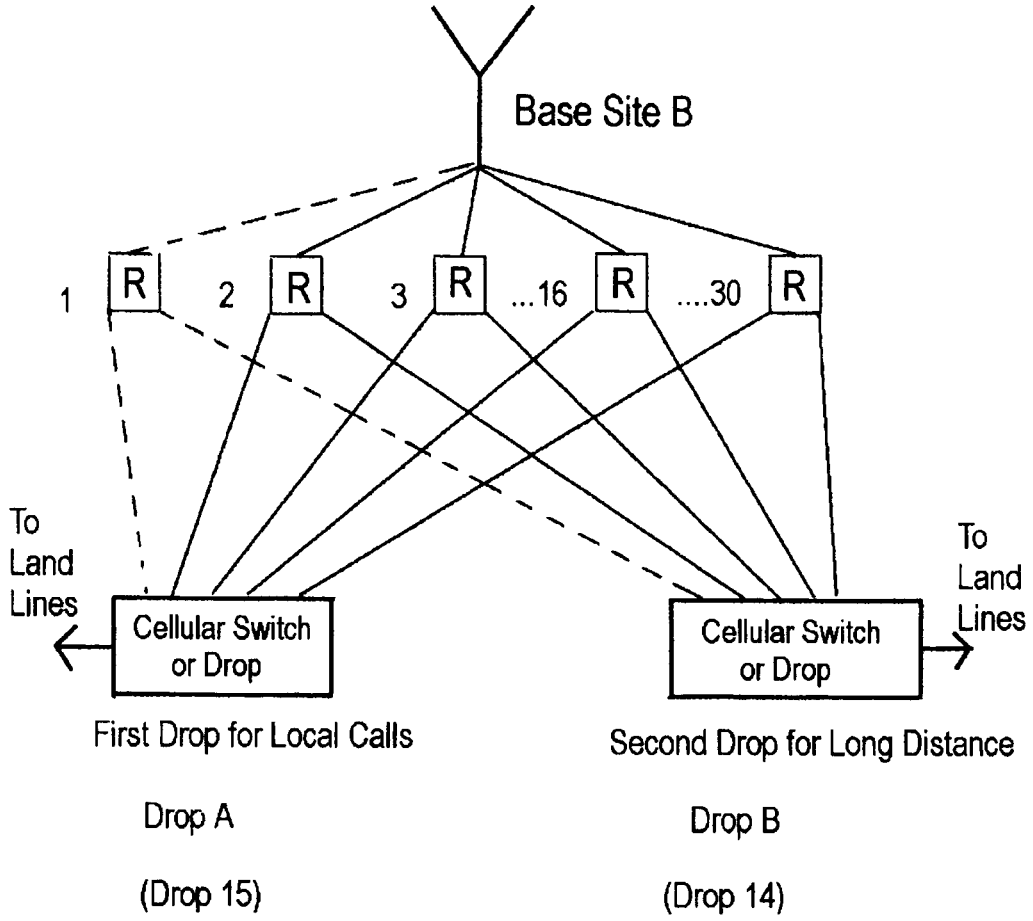
FIG. 2 shows a base site being served by two different switches.

Refer to FIG. 2 which shows the inventive method wherein at base site B each radio pair is wired to a relay at base site B that can be used to route the call to either the drop 14 that is used for long distance calls or the drop 15 that is used for local calls. Other base sites of the system would be similarly connected. Note, of course, that sites in low usage areas would still be connected in the prior art manner.

In a preferred embodiment of the invention, routes are created automatically as disclosed in referenced patent U.S. Pat. No. 5,793,842. In the referenced patent the system includes multiple nodes and links between the nodes that are combined into routes that route calls to a desired drop. In another embodiment of the system explained herein, the base site uses tables are manually loaded into the base site computer that will control the routing destination. This alternate embodiment does not utilize multiple links thru multiple nodes, but just routes calls from a base site to a desired drop based on the desired exchange. In one utilization of this concept, wire lines are used from the base site back to the various drops. A combination of both wire (land) lines and radio can also use these concepts to build a operational system.

Many cellular systems are built to a so-called the AMPS standard. The AMPS standard comprises a series of precise protocols such that different manufacturers products will work together in a common manner. In AMPS systems, various base sites are given a limited number of radios that transmit and receive only on specific paired frequencies. Whereas a total cellular system might have hundreds of paired radio channels, a given base site might have only 30 different radios. Each of these 30 different radios transmits and receives on a specific frequency pair that is carefully chosen to avoid co-channel interference with adjacent cell sites; each of these 30 radios was hard wired back to a switch which utilizes a circuit that supported a duplex conversation. The switch contains the logic to connect the radios into the land line telephone system, record information for billing purposes, and also control handoff. For explanation purposes consider a simple system with only two drops. These drops correspond to the switches in a conventional AMPS cellular system. Consequently, there is a need for 30 duplex circuits leaving the base site going to the first drop and another 30 circuits going to the second drop.

A method of connecting any of these 30 different radios to any of the 60 different output circuits would be to install a switching matrix of size 30 by 60 which might involve up to 1800 relays, or else an expensive computerized switching machine to handle up to 30 simultaneous duplex audio transfers. A computer/switching system at each base site that stores routing tables, that controls the muting decisions, and also controls the actual connections back to the various drops could be used.

Refer to FIG. 2 which shows the inventive method of implementation the routing concepts in above referenced U.S. Pat. No. 5,793,842 by utilizing a simpler method of call connection. The concept is based on the premise of avoiding complexity at the base site, and letting the routing computer at the base site make only routing decisions, and pass all the remaining complexity back to the various drops. The routing computer consequently only need to make a routing decision and the appropriate connection.

In the inventive system there is a signaling channel and when a call is being set up, the various messages are sent over the air thru the signaling channel, and then this signaling channel is routed directly back to the cellular switch. The present invention mutes the signaling channel thru the base site computer. The base site computer does not alter the contents of the signaling messages, but only records the call destination for the remote user. The base site computer brings the signaling message into its memory. The base computer then compares the call destination (area code and exchange) with a pre-stored table in the computer to determine the drop that should handle the call. Then the computer retransmits the signaling message to the desired drop. In the simple case of a two drop system, there is a single relay that can switch the output of the computer to the signaling circuit of either drop.

Each of the 30 circuits from the radios in the base site goes to a single relay (30 relays in total) that will send the call along to the desired drop. In FIG. 2 the box indicated as R depicts 30 different relays each controlling a duplex circuit to either the local call cellular switch or the long distance cellular switch. It should be understood that the number 30 not limiting, but only chosen as an example. Each relay will have a choice of only two circuits. For example, radio number 16 can only be connected to line 16 back to drop A or radio number 16 can only be connected to line 16 back to drop B. Consequently, the required cross bar is replaced with a simple computer that controls 30 audio channel relays and 1 switching channel relay. The audio channels do not go thru the computer which greatly simplifies the design of the computer. The base site computer only has to perform the straightforward function of decoding the signaling messages to retrieve the desired telephone exchange, and utilizing that information to close the appropriate relays.

In some instances the drops choose the next available radio in sequence to handle the call. However, most systems have a method of monitoring before assignment, and when it is desired to install a system without modification of the drop logic, one could easily indicate by various means that the channel was noisy, if it were being used by the alternate drop, etc. For a further explanation of the inventive concept, refer first to FIG. 1 that depicts a portion of a prior art cellular radio system. There are four base sites shown in FIG. 1. Base site A has only three radios and three duplex circuits back to the switch. Base site A also has a control channel shown as a dotted (dashed line) back to the switch. Base site B has only two radios, and the two duplex circuits back to the base site are shown. The control channel is shown as a dotted (dashed line).

Refer to FIG. 2 which depicts the embodiment of the system for base site B only. In this showing there are two potential drops in the system and local telephone calls are being routed to the first drop. Long distance calls are being routed to the second drop. This embodiment is useful for a long distance company that owns a local cellular system and permits the cellular operator to limit the number of companies involved in the call completion process.

FIG. 2 shows that only thirty relays are required at base site B to make the system operational, instead of the prior art 30 by 30 matrix switching circuit. One is able to implement the system with only thirty relays that close the two voice circuits and the control channel circuit as appropriate.

The foregoing leaves the matrix switching apparatus in the drop, and permits a selection of drops by simple connect and disconnect switching hardware at the node.

Figure 3:
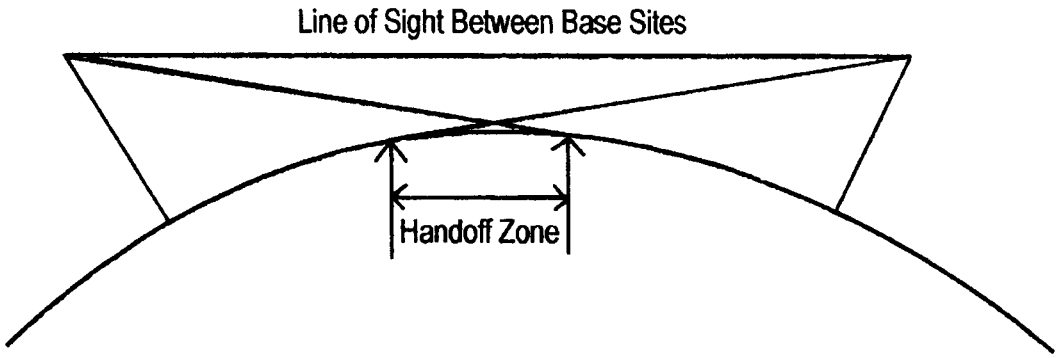
FIG. 3. Shows that adjacent base sites typically have good line of sight between them.

The present invention includes another important improvement to the concepts disclosed in U.S. Pat. No. 5,793,842. The improvement relates to the method of choosing antennas for base to base communications. Base to base radio paths in a cellular system typically have good propagation characteristics. It is known that the insertion of obstructions in the path of a radio signal cause significant shadows that greatly reduce the received signal strength. In many instances it is very difficult to transmit radio signals thru tall buildings and around the curvature of the earth. Refer to FIG. 3 that shows that base sites must have significant height with respect to the curvature of the earth in order to permit a hand off zone for the mobiles operating in the cellular system. If two base sites are positioned such that they have good overlapping coverage to supply a good radio signal to a mobile, it then usually follows that those two base sites have good line of sight between each other.

It is also known in cellular radio that using sectoring antennas at base sites to direct signals to and from mobiles accomplishes two important things. The first is that the desired signal level is increased which offers better communication. The second is that spectrum efficiency is improved in that antennas only radiate in one direction, and consequently, radio waves are spread in only one direction. The method described herein below uses actual signal strength measurements to assign antenna patterns.

In the method of radio routing described herein, advantages of better signal quality and also better spectrum utilization occur when directional antennas are added to the base sites to help the radio routing function between base sites. In this embodiment, six different antennas, each of sixty degrees are mounted to improve the radio routing function. Each antenna has specific radios attached directly to the antenna. The initial routing tables explained in referenced U.S. Pat. No. 5,793,842, are modified to take into account these different antennas. For example, table II in Col 8 which is reproduced below is modified as will be explained.

TABLE II

| Time Slot No. | User of Slot |
|---|---|
| 1 | L001 (Located in Round Lake) |
| 2 | L002 (Schaumburg) |
| 3 | L003 (Evanston) |
| 4 | L004 (Glenview) |
| 5 | L005 (Lisle) |
| 6 | L006 (Libertyville) |
| . | . |
| . | . |
| . | . |
| 27 | L027 (Antioch) |
| . | . |
| . | . |
| . | . |
| 1001 | 1001 (Peoria node) |
| . | . |
| . | . |
| . | . |
| 1133 | 1133 (Lincolnshire node) |
| 1188 | 1188 (Libertyville node) |

The Lincolnshire site, #1133, depicted above becomes six different sites in the routing process as follows:

Lincolnshire #1133-A First Antenna
Lincolnshire #1133-B Second Antenna
Lincolnshire #1133-C Third Antenna
Lincolnshire #1133-D Fourth Antenna
Lincolnshire #1133-E Fifth Antenna
Lincolnshire #1133-F Sixth Antenna The Libertyville site, #1188, becomes six different sites in the routing process, as follows:

Libertyville #1188-A First Antenna
Libertyville #1188-B Second Antenna
Libertyville #1188-C Third Antenna
Libertyville #1188-D Fourth Antenna
Libertyville #1188-E Fifth Antenna
Libertyville #1188-F Sixth Antenna Table II has base site numbers and corresponding time slots, the table is now expanded to include 6 different time slots for the Lincolnshire site, and 6 different time slots for the Libertyville site. (If the Grays Lake site had only two 180 degree antennas, that it would have only two time slots for its use)

Consequently, when the Libertyville site transmits on the first antenna, it is transmitting in its first time slot. When the Libertyville site transmits of the second antenna, it is transmitting in its second time slot. When the Lincolnshire site listens to the various time slots, it listens on all of its directional antennas. (Actual physical locations and compass directions are not utilized.) Consequently, there are a total of 36 different possible links between Libertyville and Lincolnshire that could be utilized if Lincolnshire desired to contact Libertyville to route a call. These 36 different possibilities are added to the table at the Lincolnshire site, as the Lincolnshire site listens to Libertyville. In fact, a northern pointing Libertyville site, might not even be heard by the southern pointing Lincolnshire site. In fact, a western pointing Lincolnshire site might not hear an eastern pointing Libertyville site.

Figure 4:
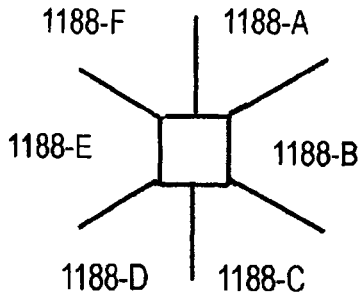
FIG. 4 Shows two base sites, and the corresponding patterns of directional antennas.
Figure 4:
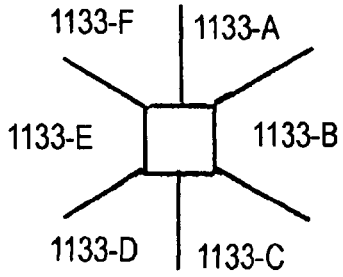

Consequently, in real world operation, the Lincolnshire site might only hear 14 of the possible 36 combinations, and might only record these 14 into its initial routing table. Refer to FIG. 4, which depicts 60 degree antennas and their corresponding position. For example, Lincolnshire site 1133-C might not hear Libertyville site 1188-F, and this would never be entered into the table. Lincolnshire site 1133-E might bear Libertyville Site 1188-B with the strong signal strength and that would be added to the table. In fact, that particular combination would probably end up the strongest path, and that would be the final entry in the table. The creation of the table is dynamic and totally automatic. Instantaneous signal strengths are utilized. However, the Lincolnshire site, immediately after listening to Libertyville, eliminates the weaker combinations. There is no reason to keep the weaker signal paths between the two base sites. Although this process initially includes numerous possible propagation links, these are immediately reduced in the tables, and the tables remain the same length. The only final addition to the tables at each base site is the antenna that it should use for transmission, and the antenna that each site should use for receiving, in the case that these two sites need to create a communication path.

Following is a more specific representation of a portion of the transmissions made by the Libertyville node as previously shown in and Table XII of U.S. Pat. No. 5,793,842 as shown below.

TABLE XII

| | |
|---|---|
| 1188 | Land node number |
| 546 | Prefix |
| 3 | Links |
| 32 | Signal Strength |

The first line in the following table represents the transmission from the first sectoring antenna, the second line represents the transmission from the second sectoring antenna. The third, fourth, fifth, and sixth line are also respectively from the third, fourth, fifth, and sixth sectoring antenna.

NEW TABLE XXX

| Node | Prefix | Links | Signal Strength |
|---|---|---|---|
| 1188-A | 546 | 3 | 42 |
| 1188-B | 546 | 3 | 42 |
| 1188-C | 546 | 3 | 42 |
| 1188-D | 546 | 3 | 42 |
| 1188-E | 546 | 3 | 42 |
| 1188-F | 546 | 3 | 42 |

Referring to Table XII, the weakest signal strength in the route to 546 was 32 Db over threshold. However, because of increased antenna gain in both the transmitting and receiving antennas along the various links to Round Lake exchange 546, the minimum signal strength is now 42 Db.

Now, the Lincolnshire node receives each of the above six transmission at six different antennas. The following table is for the receiving antenna at node 1133-A. However, because the receiving antenna 1133-A points in a north northeasterly direction that is not directed towards the Libertyville node, only one signal is heard. This signal bounced off building and came from 1188-B. It is a very weak signal

NEW TABLE XXXI

| Node | Prefix | Links | Signal Strength | New Sig. Str. |
|---|---|---|---|---|
| 1188-B | 546 | 3 | 42 | 12 |

Following are the signals received at node 1133-B which points in an easterly direction. Because 1133-B pointed in an easterly direction, it did not receive any signal good signals, but did receive a very weak signal from both 1188-B and 1188-C.

NEW TABLE XXXII

| Node | Prefix | Links | Signal Strength | New Sig. Str. |
|---|---|---|---|---|
| 1188-B | 546 | 3 | 42 | 8 |
| 1188-C | 546 | 3 | 42 | 5 |

The results at 1133-C, 1133-D not shown here, were also primarily weak signals. However, we now show the received signals at 1133-E which is an antenna that is pointing somewhat in the direction of the Libertyville node.

TABLE XXXIII

| Node | Prefix | Links | Signal Strength | New Sig. Str. |
|---|---|---|---|---|
| 1188-A | 546 | 3 | 42 | 5 |
| 1188-B | 546 | 3 | 42 | 52 |
| 1188-C | 546 | 3 | 42 | 50 |
| 1188-D | 546 | 3 | 42 | 18 |
| 1188-E | 546 | 3 | 42 | 2 |

The results from the receiving antenna 1133-F were as follows.

TABLE XXXIV

| Node | Prefix | Links | Signal Strength | New Sig. Str. |
|---|---|---|---|---|
| 1188-A | 546 | 3 | 42 | 5 |
| 1188-B | 546 | 3 | 42 | 40 |
| 1188-C | 546 | 3 | 42 | 38 |
| 1188-D | 546 | 3 | 42 | 9 |

Before any other calculations are made, the node at Lincolnshire, node 1133 immediately goes thru the above tables for each receiving antenna, and leaves only the choice with the best received signal strength from all of the tables. Antenna 1133-E received the strongest transmission from site 1188-B as noted in the above tables at 52 Db over threshold. Consequently, only this transmission is carried forward as follows:

TABLE XXIV

| Node | Prefix | Links | Signal Strength | New Sig. Str. | Antenna |
|---|---|---|---|---|---|
| 1188-B | 546 | 3 | 42 | 52 | 1133-E |

Additional calculations are performed as explained previously to finish the routing calculations. It was the intent above only to show how directional antennas are added into the system. Later, when Lincolnshire node number 1133 desires to contact Libertyville node number 1188 to place an actual call, Lincolnshire will know which antenna to use for transmission, and it will know which antenna to contact at the Libertyville site.

The aforementioned process of utilizing 60 degree antennas will enhance spectrum utilization by about a factor of six. Only small sectors are illuminated when creating usable links for a specific conversation. In the dynamic channel assignment process that occurs when setting up an actual call, the reduced interference received from remote conversations will enhance the number of usable channels. The desired signal strength is enhanced because of the directional antennas, and the undesired signal is decreased because the base sites are perhaps using antennas that do not point towards the base site in question.

A further optional improvement can be added for even greater spectrum utilization. Steerable arrays are well known. Such arrays create narrow beams by utilizing a series of small antennas to which the phases of the signals are adjusted. When Lincolnshire and Libertyville are in communication, this additional known technology will focus both the transmitting and receiving beams less than 60 degrees to further enhance spectrum efficiency and further enhance signal to noise performance.

U.S. Pat. No. 5,793,842 discloses a system where multiple bands are utilized to perform the different types of communication. For example, base to mobile communications occur in the traditional mobile to base bands, and node to node communications can occur in the new Multipoint bands. In large metropolitan areas where it is desired to maximize the amount of mobile to base communication, such a band allocation is very desirable. However, a novel re-arrangement of the existing base (node) to mobile channels and existing mobile to base (node) channels provides an improvement which is more practical in sparsely populated areas and in third would countries.

The invention described herein can be utilized in various ways, and the following three applications disclose alternate methods of band allocation.

Highly congested cellular systems such as systems in Chicago, Miami, etc. etc. Low density applications of cellular radio as found in Idaho, Nebraska, etc. etc. Third world countries where cellular is used instead of land line phone systems.

In highly congested cellular systems such as one finds in Chicago, Miami, and other high populated places, spectrum for node to mobile and mobile to node will be highly utilized, and the band utilization methods suggested in this embodiment will have limited application. However, for new systems in Chicago and Miami, the methods suggested in this embodiment would have value until usage to grew to a congested amount. For systems designed for the third world, the spectrum load will not be significant, and the methods of this embodiment will be useful. For systems designed for low density applications, the spectrum load will not be significant, and the methods of this embodiment will be useful.

One of the technical problems that is solved in cellular radio is the problem of permitting the mobile unit to both talk and listen simultaneously. This same problem is encountered at the base site. Part of the solution to this problem lies in the method of band assignment to cellular radio. Cellular radio systems are divided into two different bands, and these bands are not next to each other. It is this band separation that permits the delicate receiver to operate in the presence of a booming, in comparison, transmitter. If the transmitter and receiver were close to each other in frequency, the problems of duplex operation would increase, and the cost would also increase.

To utilize the existing cellular bands to perform the repeater function is an attractive alternative, but one that must be approached under the limitation that at any one location, the separation of the two cellular bands must be maintained.

The method to utilize the existing bands of cellular frequencies, is to make blind nodes. The new method is consistent with the odd and even nodes disclosed in U.S. Pat. No. 5,793,842. Alternate nodes in a route must transmit and receive on alternate frequencies. For example, if a node transmits on channel 17, the next node in the route must listen on channel 17. This requirement led to the even and odd nodes as described in said patent. In the new method, this node differentiation is maintained, but a novel feature is added as is explained herein below. In this method, half of the node sites would be inoperable with respect to direct mobile to node operation. This would correspond to the odd nodes being blind to node to mobile operation. The odd nodes in effect become inoperable for base to mobile communications. These odd nodes would be operable for routing or node to node communication. These nodes would be "blind" to the operation of the remotes and mobiles. However, since these nodes would not serve the existing remotes, they would utilize the bands of frequencies in the identical method used for the remotes. In this method, the signaling channel that is already present to set up the node to mobile operation is used with different codes to also set up the routes and the channel assignment from normal nodes thru blind nodes to create the routes. In this particular utilization of the cellular bands, Table I of '842 which had a total of 10 different bands is reduced to the two bands as explained below. In the table below the signaling channel is one of the channels in the appropriate band.

| Bandflocation | Mobile | Normal Node | Blind Node | Drop |
|---|---|---|---|---|
| Mobile Transmit Band | Transmits | Receives | Transmits | Transmits |
| Mobile Receive Band | Receive | Transmits | Receive | Receive |

In the above greatly simplified table, the normal base (node) operation and the normal mobile operation occur quite as in a conventional cellular system. However, the normal base (node) can also talk directly to a drop that is configured exactly like a mobile. However, the normal node would utilize multiple channels, and the drop would also utilize normal channels. In this method, the talking and receiving problems that are created in a single band are avoided.

The signaling channel will be highly utilized, but relief is provided by accomplishing the route creation process only at night when the system is not highly utilized. In smaller systems, the amount of routing messages is not significant, and the system performs satisfactorily.

This band allocation option permits the normal node to transmit to any one of a number of drops that would be in range. However, the normal node could also utilize blind nodes to repeat the calls to another normal node that would create a route. The above table of frequency allocations permits a simple installation where there are no blind nodes and the normal nodes can transmit to any number of drops that might be within radio range. This simple installation could be later expanded by the addition of blind nodes that would only serve in a repeater function.

The advantage of easy of manufacturing, limited bands and the elimination of potential licensing problems, and simplified system design are obvious for this approach.

Figure 5:
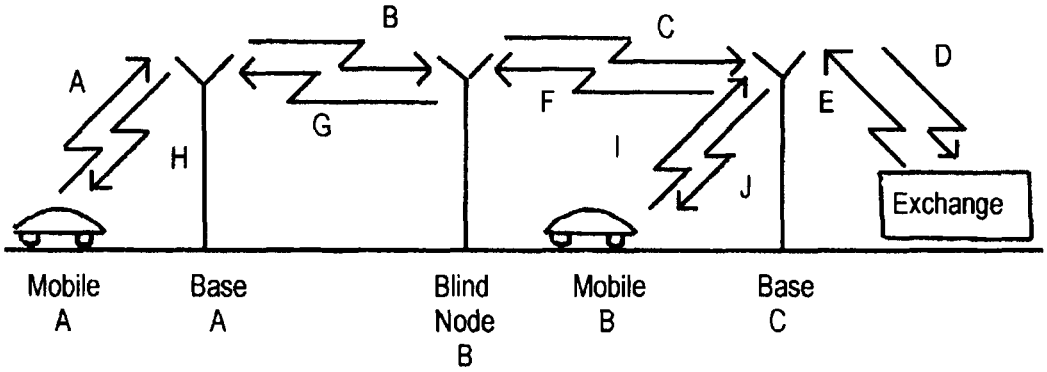
FIG. 5. Shows the concept of a blind node routing communications in the same band back to a central switch.

Refer to FIG. 5. In this figure, Mobile A is in a conversation that is routed to the indicated exchange. Also, Mobile B is in a different conversation that is also routed to the same exchange.

Mobile A initially transmits on channel A which is in the Mobile to Base Band

Message is re-transmitted on channel B which is in the Base to Mobile Band

Message is re-transmitted on Channel C which is in the Mobile to Base Band

Message is re-transmitted on Channel D which is in the Base to Mobile Band

Exchange initially transmits on channel E which is in the Mobile to Base Band

Message is re-transmitted on Channel F which is in the Base to Mobile Band

Message is re-transmitted on Channel G which is in the Mobile to Base Band

Message is re-transmitted on Channel H which in the Base to Mobile Band

Simultaneously, Mobile B is transmitting on Channel I in Mobile to Base Band

Mobile B is receiving on channel J which is in the Base to Mobile Band.

(The connection of Mobile B to the Exchange is not shown)

In FIG. 5, Mobile B is shown in normal communication with Base C in vicinity of the Blind Node. The required band separation to achieve full duplex operation is maintained at the Blind Node, at Base C, and at Mobile B. Both the routing and base to mobile communications are satisfactorily carried out in the same set of bands.

While the invention has been particularly shown and described with reference to preferred embodiments thereof, it will be understood by those skilled in the art that various changes in forms and details made be made therein without departing from the spirit and scope of the invention.

What is claimed is:

[1. In multi-node, multi-remote radio telephone systems, a method of call connection and call routing between said multiple nodes comprising:

a) using destination number designations and routing tables to select different routes for different calls;

b) utilizing directional or beam antennae for communications between said nodes;

c) providing a first set of beams from a first node, and providing a second set of beams from a second node, a beam from the first node and a beam from the second node comprising a pair;

d) measuring the signal strengths created by pairs of beams; and e) selecting a beam pair between different nodes with the highest signal strength, for communications by eliminating beam pairs that have the weaker signals, whereby the multi-nodes comprise base sites, repeaters, and exchanges, wherein the exchanges may be from different radio telephone systems.]

[2. In a multi-node, multi-remote radio telephone communications system including cellular radio systems wherein the mobiles transmit in a first band and receive in a second band, and the bases transmit in said second band and receive in said first band, a routing system of call connection and call routing comprising the following;

a) routing tables to permit different destinations for different calls selectively based on telephone number indications;

b) multiple blind nodes, each of which comprises a combination of a repeater and routing tables, said blind nodes using said routing tables to selectively communicate with base sites required to establish the selected routes;

c) said blind nodes transmitting in the band used for transmission by the mobiles;

d) said blind nodes receiving in the band used for receiving by the mobiles; and e) each said selected route comprising a path that alternates between blind nodes and bases;

whereby the entire system performs in a limited number of bands of frequencies.]

*3. A method of providing at least two radio communication routes among individual nodes capable of distribution arbitrarily relative to each other, the method comprising:*

*establishing radio links between respective pairs of said nodes using radio signals transmitted from said nodes and received by other said nodes, wherein at least some of said radio signals include routing messages;*

*using a directional radio signal transmitted from one said node in a directional link and received directly by the other said node in said directional link;*

*measuring a parameter of radio signals received by at least some of said nodes;*

*transmitting from at least some of said nodes radio signals with associated routing messages based on said measured parameter; and*

*assembling radio communication routes between at least two originating nodes and at least one destination node, wherein computers in a plurality of said nodes use routing messages received by said nodes to assemble said routes independently of any computer separate from said nodes in said routes and without regard to the relative locations of said nodes in a said route, both said routes including at least one said directional link.*

*4. A method as in claim 3, wherein no node in a said radio communication route between an originating node and a destination node simultaneously transmits and receives in the same band of frequencies.*

*5. A method as claim 3, wherein said directional radio signal is received by said other node in a said directional link using an antenna that utilizes a directional pattern to strengthen the received radio signal.*

*6. A method as in claim 3, wherein said directional radio signal is transmitted in a direction selected from one of a plurality of possible directions.*

*7. A method as in claim 3, wherein at least one route segment comprises at least two said radio links selected based on a value of the parameter in a received routing message and a measured value of the parameter of a received radio signal.*

*8. A method as in claim 3, wherein said computers use a predetermined criteria for measuring a quality of a selected route and a selected route has a higher quality than at least two other possible routes between an originating node and said destination node.*

*9. A method as in claim 3, further comprising using the routing messages to select node-to-node radio links and using computers in a plurality of nodes to assemble at least one of the routes by adding a radio link to a route segment comprising at least one previously selected radio link.*

*10. A method as in claim 3, wherein said originating nodes communicate with respective remotes.*

*11. A method of providing at least two radio communication routes among individual nodes capable of distribution arbitrarily relative to each other, the method comprising:*

*establishing radio links between respective pairs of said nodes using radio signals transmitted from said nodes and received by other said nodes, wherein at least some of said radio signals include routing messages;*

*using a directional radio signal transmitted from at least one said node in a directional link and received directly by the other said node in said directional link; and*

*assembling radio communication routes between at least two originating nodes and at least one destination node, said routes being assembled by computers in a plurality of said nodes using routing messages received by said nodes, wherein said computers in said nodes assemble said routes independently of any computer separate from said nodes in said routes without regard to the relative locations of said nodes in a said route, said originating nodes simultaneously receive communication signals from different originating remotes, and both said routes include at least one said directional link.*

*12. A method as in claim 11, wherein said routes operate simultaneously without any one node transmitting and receiving communication signals in the same frequency band.*

*13. A method as claim 12, wherein at least one said originating node simultaneously receives communication signals from two said remotes.*

*14. A method as in claim 11, further comprising using the routing messages to select node-to-node radio links and using computers in a plurality of nodes to assemble at least one of the routes by adding a radio link to a route segment comprising at least one previously selected radio link.*

*15. A method as in claim 11, wherein each node in a pair of nodes in a radio link is a different type using respective different frequency bands for transmitting and receiving communication signals.*

*16. A method as in claim 11, further comprising:*

*measuring a parameter of radio signals received by at least some of said nodes; and*

*transmitting from at least some of said nodes radio signals with associated routing messages based on said measured parameter.*

*17. A method as in claim 11, the method further comprising:*

*combining said radio links to create a wireless communication route comprising a radio link from a remote to a said originating node and radio links from said originating node through a plurality of pairs of additional nodes to said destination node; and*

*transmitting communication signals from said originating node to the other node in the radio link between said originating node and the other node in a first frequency band,*

*transmitting communication signals from the other node to said originating node in a second frequency band, receiving communication signals from said remote at said originating node in a third frequency band, and transmitting communication signals from said originating node to said remote in a fourth frequency band.*

*18. A method of providing at least two radio communication routes among individual nodes capable of distribution arbitrarily relative to each other, the method comprising:*

*establishing radio links between respective pairs of said nodes using radio signals transmitted from said nodes and received by other said nodes, wherein at least some of said radio signals include routing messages; and*

*assembling radio communication routes between at least one destination node and at least two originating nodes that receive communication signals from and transmit communication signals to respective remotes, said routes being assembled by computers in a plurality of said nodes using routing messages received by said nodes, wherein said computers in said nodes assemble said route independently of any computer separate from*

*said nodes in said routes without regard to the relative locations of said nodes in said routes, a said route including at least one route segment comprising at least two said radio links with at least two normal nodes that communicate through a blind node, wherein a normal node is one of said nodes that can exchange said communication signals with other said nodes and receive communication signals from and transmit communication signals to said remote, and a blind node is one of said nodes that can only exchange said communication signals with other said nodes and cannot receive said communication signals from or transmit communication signals to said remote.*

*19. A method as in claim 18, further comprising using a directional radio signal transmitted from at least one said node in a directional link and received directly by the other said node in said directional link, said directional radio signal being transmitted in a direction selected from one of a plurality of possible directions, wherein both said routes include at least one said directional link with at least one said blind node.*

*20. A method as claim 19, wherein said directional radio signal is received by said other node in said directional link using an antenna that utilizes a directional pattern to strengthen the received radio signal.*

*21. A method as in claim 18, wherein no node in a said radio communication route between an originating node and a destination node simultaneously transmits and receives in the same band of frequencies.*

*22. A method as in claim 18, further comprising:*

*measuring a parameter of radio signals received by at least some of said nodes; and*

*transmitting from at least some of said nodes radio signals with associated routing messages based on said measured parameter, wherein at least one route segment is selected based on a value of the parameter in a received routing message and a measured value of the parameter of a received radio signal and wherein said computers use a predetermined criteria for measuring a quality of a selected route and a selected route has a higher quality than at least two other possible routes between an originating node and said destination node.*

*23. A method as in claim 18, further comprising using a directional radio signal transmitted from at least one said node in a directional link and received directly by the other said node in said directional link, wherein both said routes include at least one said directional link with at least one said normal node.*

*24. A method as in claim 23, wherein said directional radio signal is transmitted in a direction selected from one of a plurality of possible directions.*

*25. A method of providing at least two radio communication routes among individual nodes capable of distribution arbitrarily relative to each other, the method comprising:*

*establishing radio links between respective pairs of said nodes using radio signals transmitted from said nodes and received by other said nodes, at least some of said radio signals including routing messages;*

*using a directional radio signal transmitted from one said node in a directional link and received directly by the other said node in said directional link;*

*measuring a parameter of radio signals received by at least some of said nodes;*

*transmitting from at least some of said nodes radio signals with associated routing messages based on said measured parameter; and*

*assembling radio communication routes between at least two originating nodes and at least one destination node, said routes being assembled by computers in a plurality of said nodes using routing messages received by said nodes, wherein:*

*said computers in said nodes assemble said routes independently of any computer separate from said nodes in said routes without regard to the relative locations of said nodes in a said route,*

*said originating nodes simultaneously receive communication signals from and transmit communication signals to different originating remotes,*

*both said routes include at least one said directional link, and*

*when one route includes a node in common with another route, the common node transmits communication signals in one freuqency band in both routes and receives communication signals in a different frequency band in both routes.*

*26. The method as in claim 25, wherein the parameter is signal strength.*

*27. A method as claim 25, wherein said directional radio signal is received by said other node in said directional link using an antenna that utilizes a directional pattern to strengthen the received radio signal.*

*28. A method as in claim 25, wherein at least one routing message identifies a route segment comprising at least two said radio links, said route segment being selected from multiple route segments.*

*29. A method as in claim 25, wherein said directional radio signal is transmitted in a direction selected from one of a plurality of possible directions.*

*30. A method as in claim 25, wherein at least one route segment comprising at least two said radio links is selected based on a value of the parameter in a received routing message and a measured value of the parameter of a received radio signal.*

*31. A method as in claim 25, further comprising using the routing messages to select node-to-node radio links and using computers in a plurality of nodes to assemble at least one of the routes by adding a radio link to a route segment comprising at least one previously selected radio link.*

*32. A method of providing at least two radio communication routes among individual nodes capable of distribution arbitrarily relative to each other, the method comprising:*

*establishing radio links between respective pairs of said nodes using radio signals transmitted from said nodes and received by other said nodes, at least some of said radio signals including routing messages;*

*using a directional radio signal transmitted from at least one said node in a directional link and received directly by the other said node in said directional link; and*

*assembling radio communication routes between at least two originating nodes and at least one destination node, said routes being assembled by computers in a plurality of said nodes using routing messages received by said nodes, wherein:*

*said computers in said nodes assemble said routes independently of any computer separate from said nodes in said routes without regard to the relative locations of said nodes in a said route,*

*both said routes include at least one said directional link, and*

*when one route includes a node in common with another route, the common node transmits communication sig-*

*nals in one frequency band in both routes and receives communication signals in a different frequency band in both routes.*

*33. A method as in claim 32, wherein said directional radio signal is transmitted in a direction selected from one of a plurality of possible directions.*

*34. A method as claim 32, wherein said directional radio signal is received by said other node in said directional link using an antenna that utilizes a directional pattern to strengthen the received radio signal.*

*35. A method as in claim 32, wherein at least one route segment comprising at least two said radio links is selected based on a value of a parameter of a radio signal in a received routing message and a measured value of the parameter of a received radio signal.*

*36. A method as in claim 32, further comprising using the routing messages to select node-to-node radio links and using computers in a plurality of nodes to assemble at least one of the routes by adding a radio link to a route segment comprising at least one previously selected radio link.*

*37. A method as in claim 32, wherein said originating nodes receive communication signals from respective remotes.*

*38. A method as in claim 37, wherein at least one route segment comprising at least two said radio links is selected based on a value of a parameter of a radio signal in a received routing message and a measured value of the parameter of a received radio signal.*

*39. A method of providing at least two radio communication routes among individual nodes capable of distribution arbitrarily relative to each other, the method comprising:*

*establishing radio links between respective pairs of said nodes using radio signals transmitted from said nodes and received by other said nodes, at least some of said radio signals including routing messages;*

*using a directional radio signal transmitted from one said node in a directional link and received directly by the other said node in said directional link;*

*measuring a parameter of radio signals received by at least some of said nodes;*

*transmitting from at least some of said nodes radio signals with associated routing messages based on said measured parameter; and*

*assembling radio communication routes between at least two originating nodes that receive communication signals from remotes and a destination node, said routes being assembled by computers in a plurality of said nodes using routing messages received by said nodes, wherein:*

*said computers in said nodes assemble said routes independently of any computer separate from said nodes in said routes without regard to the relative locations of said nodes in a said route,*

*both said routes include at least one said directional link, and*

*when one route includes a node in common with another route, the common node transmits communication signals in one frequency band in both routes and receives communication signals in a different frequency band in both routes.*

*40. A method as in claim 39, wherein said directional radio signal is transmitted in a direction selected from one of a plurality of possible directions.*

*41. A method as claim 39, wherein said directional radio signal is received by said other node in said directional link using an antenna that utilizes a directional pattern to strengthen the received radio signal.*

*42. A method as in claim 39, wherein at least one said originating node simultaneously receives communication signals from two remotes.*

*43. A method as in claim 39, wherein at least one route segment comprising at least two said radio links is selected based on a value of the parameter in a received routing message and a measured value of the parameter of a received radio signal.*

*44. A method as in claim 43, wherein said directional radio signal is transmitted in a direction selected from one of a plurality of possible directions.*

*45. A method as in claim 39, wherein said directional radio signal is transmitted by a steerable antenna array.*

*46. A method of providing at least two radio communication routes among individual nodes capable of distribution arbitrarily relative to each other, the method comprising:*

*establishing radio links between respective pairs of said nodes using radio signals transmitted from said nodes and received by other said nodes, at least some of said radio signals including routing messages;*

*using a directional radio signal transmitted from at least one said node in a directional link and received directly by the other said node in said directional link; and*

*assembling radio communication routes between at least two originating nodes that receive communication signals from remotes and at least one destination node, said routes being assembled by computers in a plurality of said nodes using routing messages received by said nodes, wherein:*

*said computers in said nodes assemble said routes independently of any computer separate from said nodes in said routes without regard to the relative locations of said nodes in a said route,*

*both said routes include at least one said directional link, and*

*when one route includes a node in common with another route, the common node transmits communication signals in one frequency band in both routes and receives communication signals in a different frequency band in both routes.*

*47. A method as in claim 46, wherein at least one said originating node simultaneously receives communication signals from two remotes.*

*48. A method as in claim 46, wherein said directional radio signal is transmitted in a direction selected from one of a plurality of possible directions.*

*49. A method as claim 46, wherein said directional radio signal is received by said other node in said directional link using an antenna that utilizes a directional pattern to strengthen the received radio signal.*

*50. A method as in claim 46, wherein at least one route segment comprising at least two said radio links is selected based on a value of a parameter of a radio signal in a received routing message and a measured value of the parameter of a received radio signal.*

*51. A method as in claim 46, further comprising using the routing messages to select node-to-node radio links and using computers in a plurality of nodes to assemble at least one of the routes by adding a radio link to a route segment comprising at least one previously selected radio link.*

*52. A method as in claim 46, wherein radio signals including routing messages are transmitted in different time slots by different said nodes.*

*53. A method of providing at least two radio communication routes among individual nodes capable of distribution arbitrarily relate to each other, the method comprising:*

*establishing radio links between respective pairs of said nodes using radio signals transmitted from said nodes and received by other said nodes, at least some of said radio signals including routing messages;*

*using a directional radio signal transmitted from at least one said node in a directional link and received directly by the other said node in said directional link; and*

*assembling radio communication routes between at least two originating nodes and at least one destination node, said routes being assembled by computers in a plurality of said nodes using routing messages received by said nodes, wherein:*

*said computers in a plurality of said nodes assemble said routes independently of any computer separate from said nodes in said route without regard to the relative locations of said nodes in said route,*

*said originating nodes simultaneously receive communication signals from and transmit communication signals to different remotes,*

*transmission of communication signals between pairs of nodes in a said route requires a first node in the pair to transmit communication signals in one band of frequencies and receive them in another band of frequencies and the second node in the pair to receive communication signals in the one band and transmit them in the other band, and*

*both said routes include at least one said directional link.*

*54. A method as in claim 53, wherein said directional radio signal is transmitted in a direction selected from one of a plurality of possible directions.*

*55. A method as in claim 53, wherein said directional radio signal is transmitted by a steerable antenna array.*

*56. A method as in claim 53, wherein at least one said node in a said route is a blind node that can only exchange said communication signals with other said nodes and cannot receive said communication signals from or transmit communication signals to a remote.*

*57. A method as in claim 56, wherein said blind node transmits a directional radio signal to another said node.*

*58. A method as in claim 56, wherein said blind node receives a said radio signal with a directional antenna.*

*59. A method as in claim 53, wherein said computers use a predetermined criteria for measuring a quality of a selected route and a selected route has a higher quality than at least two other possible routes between an originating node and said destination node.*

*60. A method as in claim 53, wherein at least one node in a said route receives communication signals from another node in said route in one channel and transmits communication signals to said other node in a different channel.*

*61. A method as in claim 60, further comprising selecting the channels based on potential interference calculations.*

*62. A method as in claim 53, wherein said individual nodes measure a parameter of received radio signals and transmit a routing message incorporating the measured value.*

*63. A method as in claim 62, further comprising using the measured values of the parameters to assemble said routes.*

*64. A method as in claim 63, further comprising using the measured value of the parameters to select channels for communication signals between said nodes in a said route.*

*65. A method as in claim 63, further comprising using the routing messages to select node-to-node radio links and using computers in a plurality of nodes to assemble at least one of the routes by adding a radio link to a route segment comprising at least one previously selected radio link.*

*66. A method as in claim 53, further comprising using the routing messages to select node-to-node radio links and using computers in a plurality of nodes to assemble at least one of the routes by adding a radio link to a route segment comprising at least one previously selected radio link.*

* * * * *